Sept. 20, 1938.   H. FÖTTINGER   2,130,717
TURBOTORQUE TRANSFORMER
Filed Dec. 19, 1935
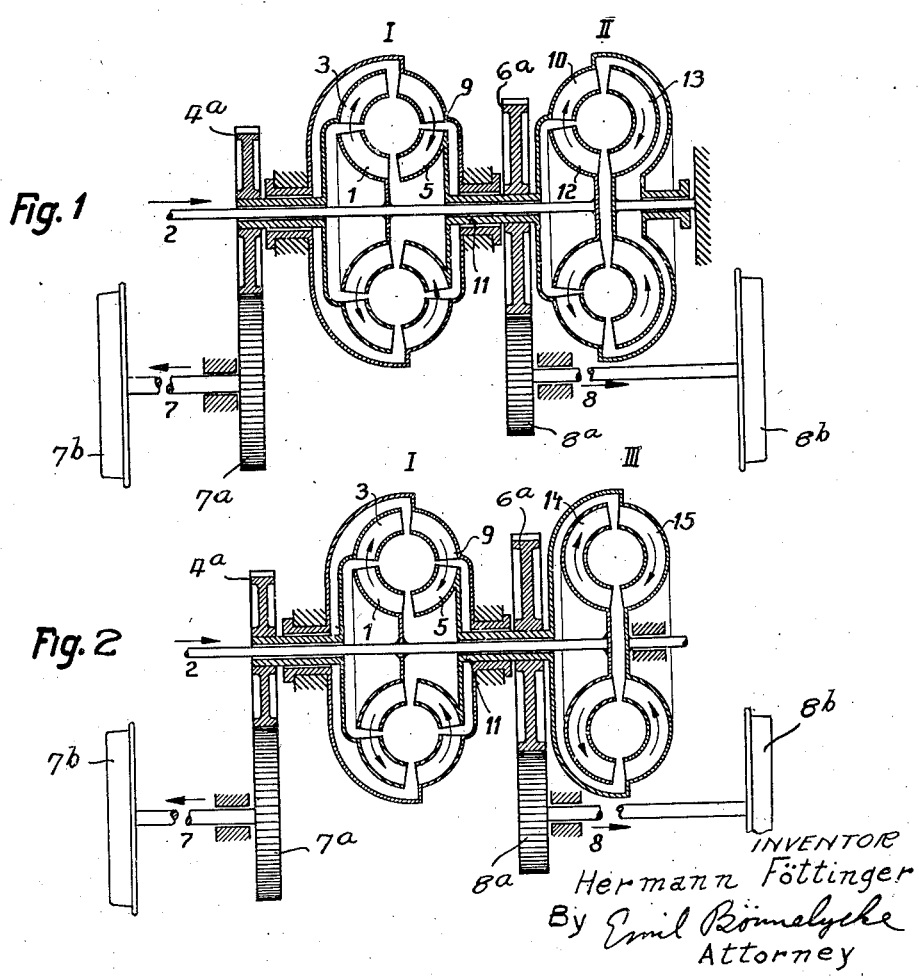
INVENTOR
Hermann Föttinger
By Emil Bönnelycke
Attorney Patented Sept. 20, 1938

2,130,717

UNITED STATES PATENT OFFICE 2,130,717

TURBOTORQUE TRANSFORMER

Hermann Föttinger, Berlin-Charlottenburg, Germany

Application December 19, 1935, Serial No. 55,298
In Germany December 22, 1934

3 Claims. (Cl. 60—54)

This invention relates to a turbo torque transformer, that is to a gearing in which the turning moment of a primary shaft, after having been transformed into another turning moment, is transmitted to a secondary shaft. It has already been proposed to insert, together with the primary wheel affixed to the primary shaft, a plurality of secondary wheels into the same hydraulic circuit and to arrange these wheels co-axially with the primary shaft.

Devices of this kind are suited especially for driving the several axles or wheel shafts of a vehicle, for instance in the manner in which two wheel shafts are to be driven, each thereof being driven by a separate secondary wheel, by one stage of the two-stage transformer.

It is, according to the present invention, furthermore possible to start a vehicle with the aid of several wheel shafts in order to utilize the adhesion weight, but to run, when a certain speed has been attained, with only one wheel shaft. For this purpose the present improved moment transformer is connected with a hydraulic gearing comprising a primary and a secondary wheel, preferably a second turbo torque transformer, the secondary member of which is connected with one of the secondary members of the main transformer, so that a mechanical coupling is obviated. When starting, the first transformer which turns several wheel shafts is used, and when a certain speed has been attained, said first transformer is rendered inoperative, for instance by being emptied, and the second, additional transformer is connected with the driving gear, the wheels of the main transformer then running idle.

Instead of a second additional transformer a coupling, for instance a hydro-dynamic coupling, may be used.

The invention is illustrated diagrammatically and by way of example on the accompanying drawing, in which Figure 1 is partly a transverse section, and partly a front-view of, a turbo torque transformer designed according to this invention. Figure 2 is a similar representation showing a modification.

On the drawing, I denotes a main transformer and II a second additional transformer. 1 (Fig. 1) denotes the primary wheel of the main transformer which is fixed to the primary shaft 2. Into the circuit of the liquid of the transformer are inserted two secondary wheels 3 and 5, of which the first (3) is connected with a sleeve or short hollow shaft 4 surrounding the shaft 2 and having secured to it a gear-wheel 4ª. The secondary wheel 5 is fixed to a shaft 11 provided with a gear-wheel 6ª. The gear-wheels 4ª and 6ª mesh with gear-wheels 7ª and 8ª secured to shafts 7 and 8 which constitute, or are connected with, the driving shafts of the vehicle carrying the wheels 7ᵇ and 8ᵇ. The entire gearing is intended for driving two axles or wheel-shafts of the vehicle. 9 denotes a guide wheel likewise constituting a member of the transformer.

By suitably selecting the ratio of transmission of the gear-wheels 4ª and 7ª on the one side and 6ª and 8ª on the other side, the number of revolutions of the two secondary wheels 3 and 5 may be brought into such a ratio as is desirable in hydro-dynamic practice.

The short hollow shaft 11 is connected with the secondary wheel 10 of the transformer II. The primary shaft 2 extends through the sleeve or hollow shaft 11 and is provided with a secondary primary wheel 12, to the circuit of which is included said wheel 10, as well as a stationary guide wheel 13.

When the transformer I has been connnected up to the driving gear of the vehicle, for instance at starting, the two shafts 7 and 8 are driven by the intermediary of the gear-wheels 4ª and 7ª on the one side and 6ª and 8ª on the other side. When a certain speed has been attained, the transformer I is emptied so as thereby to be disconnected from the gearing and the transformer II is connected up to the same by filling with fluid so that now solely the shaft 8 is driven, whereas the transformer I and the shaft 7 run idle.

In the modification illustrated in Fig. 2, the arrangement and combination of the parts is practically the same as in Fig. 1, with the exception that in lieu of the additional transformer of Fig. 2 (II) a hydro-dynamic coupling (III) is provided. The action of the main transformer (I) is the same as in the other constructional forms shown and described. 15 denotes the secondary wheel of the hydro-dynamic coupling which is connected with the sleeve or hollow shaft 11. 14 denotes the primary wheel of the coupling. Besides the just described differences betwen the Figs. 1 and 2, another difference resides therein that the stationary guide-wheel 13 of Fig. 1 has been dispensed with in Fig. 2.

I wish it to be understood that my invention is not limited to the two constructional forms shown merely by way of example. Many other constructional forms all embodying the principle of my invention are possible.

I claim:—

1. In combination, a turbo torque transformer comprising a primary wheel and a plurality of secondary wheels, another transformer of the type described comprising a primary wheel and a secondary wheel, a common shaft for the primary wheels of said two transformers and each transformer having a guide wheel, a rigid connection between one of the secondary wheels of the one transformer and the secondary wheel of the other transformer, and secondary shafts all able to rotate in the same direction independent from one another and each having one of said secondary wheels of the first mentioned transformer fixed thereto.

2. In combination, a turbo torque transformer comprising a primary wheel, a guide wheel, and a plurality of secondary wheels, a hydro-dynamic coupling comprising a primary wheel and a secondary wheel, a common shaft for the primary members of said transformer and said coupling, a rigid connection between one of the secondary members of the said transformer with the secondary member of the said coupling, and secondary shafts capable of rotation in the same direction independent from one another, and each having one of said secondary wheels of the transformer fixed thereto.

3. In combination, a turbo torque transformer, comprising a primary wheel and a plurality of secondary wheels, a hydraulic gearing comprising a primary wheel and a secondary wheel, a common shaft for the primary wheels of the said transformer and gearing, a rigid connection between one of the secondary wheels of the transformer and a secondary wheel of the hydraulic gearing, and secondary shafts all being capable of rotation in the same direction independent from one another and each having one of the said secondary wheels of the transformer affixed thereto.

HERMANN FÖTTINGER.